(12) United States Patent
Nam

(10) Patent No.: US 10,497,983 B2
(45) Date of Patent: Dec. 3, 2019

(54) FOLDING DEVICE FOR MANUFACTURING ELECTRODE ASSEMBLY AND METHOD FOR MANUFACTURING STACK/FOLDING TYPE ELECTRODE ASSEMBLY

(71) Applicant: LG CHEM, LTD., Seoul (KR)

(72) Inventor: Ye Jin Nam, Daejeon (KR)

(73) Assignee: LG Chem, Ltd., Seoul (KR)

(*) Notice: Subject to any disclaimer, the term of this patent is extended or adjusted under 35 U.S.C. 154(b) by 0 days.

(21) Appl. No.: 16/088,556

(22) PCT Filed: Dec. 1, 2017

(86) PCT No.: PCT/KR2017/014037
§ 371 (c)(1),
(2) Date: Sep. 26, 2018

(87) PCT Pub. No.: WO2018/105964
PCT Pub. Date: Jun. 14, 2018

(65) Prior Publication Data
US 2019/0131659 A1    May 2, 2019

(30) Foreign Application Priority Data

Dec. 7, 2016 (KR) .................. 10-2016-0165779

(51) Int. Cl.
*H01M 10/0583* (2010.01)
*H01M 10/04* (2006.01)
*H01M 2/16* (2006.01)

(52) U.S. Cl.
CPC ..... *H01M 10/0583* (2013.01); *H01M 2/1673* (2013.01); *H01M 10/0404* (2013.01);
(Continued)

(58) Field of Classification Search
CPC ........... H01M 10/0583; H01M 2/1673; H01M 10/0404; H01M 10/0459; H01M 10/0468; H01M 10/0472
See application file for complete search history.

(56) References Cited

U.S. PATENT DOCUMENTS

2011/0104567 A1    5/2011  Lee
2013/0260199 A1   10/2013  Min et al.

FOREIGN PATENT DOCUMENTS

EP         3 035 432 A1    6/2016
JP        2009-289661 A   12/2009
(Continued)

OTHER PUBLICATIONS

Supplementary European Search Report in corresponding European Application No. EP17877573.0, dated May 13, 2019, 10 pages.
(Continued)

*Primary Examiner* — Helen Oi K Conley
(74) *Attorney, Agent, or Firm* — Mintz Levin Cohn Ferris Glovsky and Popeo, P.C.; Jhongwoo Peck

(57) ABSTRACT

The present disclosure provides a folding device for manufacturing an electrode assembly having a structure in which plate type unit cells are wound with a separator film, including:
a mandrel configured to rotate and wind a web in which plate type unit cells are arranged on an upper surface of the separator film at predetermined intervals so that the unit cells are sequentially stacked with the separator film interposed therebetween; and
a pair of rollers configured to horizontally bend a surplus winding end portion of the separator film, which is formed by arranging a first unit cell at a winding start portion of the web in a state of being spaced apart from a winding end portion of the separator film, in a direction covering an upper surface of the first unit cell,
(Continued)

wherein the mandrel includes one or more grippers composed of one or more upper legs configured to fix an upper surface portion of the first unit cell and one or more lower legs configured to fix a lower surface portion of the separator film corresponding to the upper legs, and the pair of rollers operate to vertically bend the surplus winding end portion of the separator film upward and then horizontally bend the surplus winding end portion toward the upper surface of the unit cell.

13 Claims, 3 Drawing Sheets

(52) U.S. Cl.
CPC ... *H01M 10/0459* (2013.01); *H01M 10/0468* (2013.01); *H01M 10/0472* (2013.01)

(56) References Cited

FOREIGN PATENT DOCUMENTS

| | | |
|---|---|---|
| JP | 2015-41574 A | 3/2015 |
| JP | 2016-110768 A | 6/2016 |
| KR | 20-0341487 Y1 | 2/2004 |
| KR | 10-2013-0101178 A | 9/2013 |
| KR | 10-2013-0102869 A | 9/2013 |
| KR | 10-1490845 B1 | 2/2015 |
| KR | 10-2015-0049969 A | 5/2015 |
| KR | 10-1603074 B1 | 3/2016 |
| KR | 10-2016-0051347 A | 5/2016 |
| KR | 10-2016-0079249 A | 7/2016 |
| KR | 10-2016-0094620 A | 8/2016 |

OTHER PUBLICATIONS

International Search Report for PCT/KR2017/014037 dated Mar. 12, 2018.

FOLDING DEVICE FOR MANUFACTURING ELECTRODE ASSEMBLY AND METHOD FOR MANUFACTURING STACK/FOLDING TYPE ELECTRODE ASSEMBLY

TECHNICAL FIELD

The present disclosure relates to a folding apparatus for preparing an electrode assembly and a manufacturing method of a stack/folding-type electrode assembly.

BACKGROUND ART

As the technical development of and the demand on mobile devices increase, the demand on secondary batteries as an energy source has rapidly increased, and use of the secondary batteries as a power source for electric vehicles (EVs) and hybrid electric vehicles (HEVs) has been recently realized. Among such secondary batteries, the demand for lithium secondary batteries with high energy density, high discharge voltage and output stability is high.

An electrode assembly constituting a secondary battery is largely classified into a jelly-roll type (wound type) and a stacked type (laminated type) according to the structure of the electrode assembly consisting of a positive electrode, a separator and a negative electrode. A jelly-roll type electrode assembly is manufactured by coating a metal foil used as a current collector with an electrode active material, drying and pressing, cutting the coated metal foil into a band shape having a desired width and length, and separating a negative electrode and a positive electrode using a separator, followed by spirally winding. Although the jelly-roll type electrode assembly is suitable for a cylinder type battery, the jelly-roll type electrode assembly has disadvantages such as peeling of an electrode active material and low space utilization when applied to a prismatic type battery or a pouch type battery. On the other hand, the stacked type electrode assembly has a structure in which a plurality of positive electrode and negative electrode units are sequentially stacked, and thus, the stacked type electrode assembly has an advantage of being easy to obtain a prismatic shape, but has disadvantages in that a manufacturing process is complicated and a short circuit is caused by an electrode being pushed when an impact is applied.

In order to solve these problems, as an electrode assembly having an advanced structure that is a mixed type of the jelly-roll type and the stacked type, an electrode assembly having a structure in which unit cells of a full-cell of a positive electrode/separator/negative electrode structure or a bi-cell of a positive electrode (negative electrode)/separator/negative electrode (positive electrode)/separator/positive electrode (negative electrode) structure of a certain unit size are folded by using a long continuous film of a separator has been developed and disclosed in Korean Patent Application Publication Nos. 2001-82058, 2001-82059, 2001-82060, and the like. In this application, an electrode assembly having such a structure is referred to as a stacked/folded type electrode assembly.

The stacked/folded type electrode assembly is manufactured through a winding process using a mandrel. Conventionally, since a first unit cell, which is located at a position in which winding is started, among unit cells arranged on a separator film is arranged in a state of being separated from a winding end portion of the separator film, a surplus winding end portion of the separator film is folded out toward a gripper of a mandrel in a winding process, and in this case, the surplus winding end portion may be not neatly folded during winding and a defect such as being folded in a straight line may occur.

In order to solve the above problem, a separator inner folding (SIF) process, in which a surplus winding end portion of a separator film near a position in which winding is started is folded inward toward a first unit cell located at a winding start point by using a blower method using wind, is applied.

FIG. 1 is a schematic view of a conventional folding device 10 in which the above described method is applied, and FIG. 2 is a schematic view for describing a folding phenomenon of a separator that occurs after the above described method is applied.

Referring to FIGS. 1 and 2, the folding device 10 includes a unit cell arrangement unit 12 configured to arrange unit cells 2, 3, 4, 5 and 6 at a predetermined interval on a separator film 1, a pair of rollers 15 configured to press the separator film 1 and the unit cells 2, 3, 4, 5, and 6, a blower 13 configured to inwardly fold a surplus winding end portion 11 of the separator film in a direction covering an upper surface of a first unit cell 2 by blowing wind to the surplus winding end portion 11 of the separator film at a lower portion of the separator film 1 which is opposite to a direction in which the unit cells 2, 3, 4, 5, and 6 are arranged, and a mandrel 14 configured to hold and rotate the separator film 1 together with the unit cells 2, 3, 4, 5, and 6 and so that the unit cells 2, 3, 4, 5, and 6 are sequentially stacked with the separator film 1 interposed therebetween.

However, even in such a structure, as shown in FIG. 2, a portion of the surplus winding end portion 11 of the separator film 1 may not be properly folded inwardly due to the specificity of a method using wind, and a separator folding (11-1) phenomenon still occurs, resulting in occurring a short circuit due to contact between the adjacent unit cells.

Therefore, there is a great need for a technique capable of completely solving the problem of the separator folding, reducing a defect rate, and improving the safety of a battery.

DISCLOSURE

Technical Problem

The present disclosure is provided to solve the above-described problems of the related art and technical problems which have been identified in the past.

The inventors of the present application have conducted intense research and various experiments and have confirmed that, a separator film is prevented from being blown in another direction when a surplus winding end portion of the separator film is folded inward and fixed by using rollers in a direction of covering an upper surface of a first unit cell. Further, since a process of pressing the folded separator film and first unit cell is performed after the rollers fold inward the surplus winding end portion of the separator film, a folding phenomenon of the separator film which may occur secondarily during winding using a mandrel is prevented. Accordingly, the conventional problems may be completely solved, and thus the present disclosure has been completed.

Technical Solution

According to an aspect of the present disclosure, there is provided a folding device for manufacturing an electrode assembly having a structure in which plate type unit cells are wound with a separator film, the device including:

a mandrel configured to rotate and wind a web in which plate type unit cells are arranged on an upper surface of the separator film at predetermined intervals so that the unit cells are sequentially stacked with the separator film interposed therebetween; and a pair of rollers configured to horizontally bend a surplus winding end portion of the separator film, which is formed by arranging a first unit cell at a winding start portion of the web in a state of being spaced apart from a winding end portion of the separator film, in a direction covering an upper surface of the first unit cell.

The mandrel includes one or more grippers composed of one or more upper legs configured to fix an upper surface portion of the first unit cell and one or more lower legs configured to fix a lower surface portion of the separator film corresponding to the upper legs, and the pair of rollers operate to vertically bend the surplus winding end portion of the separator film upward and then horizontally bend the surplus winding end portion toward the upper surface of the unit cell.

Here, the pair of rollers may be configured to operate independently of each other, or to operate in conjunction with each other.

Specifically, the pair of rollers may include a first roller located at a relatively upper portion and a second roller located at a relatively lower portion in a process of horizontally bending the surplus winding end portion.

Here, relatively located means that it is located with reference to the separator film, and thus the relatively upper portion refers to the upper surface of the separator film on which the unit cells are arranged, and the relatively lower portion refers to the lower surface of the separator film which is the other surface of the surface on which the unit cells are arranged.

Examples of specific operations of the rollers in which the rollers inwardly fold the surplus winding end portion of the separator film in a direction of covering the upper surface of the first unit cell will be described below.

In one specific example, the first roller and the second roller move upward to vertically bend the surplus winding end portion upward in a state of being positioned close to a boundary between the first unit cell and the surplus winding end portion of the separator film at a lower portion of the separator film, and move in a direction of the first unit cell to horizontally bend the vertically bent surplus winding end portion in a direction of the upper surface of the first unit cell, so that the surplus winding end portion of the separator film may be folded inward in the direction of covering the upper surface of the first unit cell.

As described above, since the first roller and the second roller fold the entire surplus winding end portion of the separator film and also horizontally bend the surplus winding end portion in the direction of the upper surface of the first unit cell, the rollers may hold the surplus winding end portion of the separator film to the end of a folding process. Accordingly, a phenomenon in which the separator film is blown and folded in another direction, which is a problem that may occur when a wind is blown by using a method such as a blower to fold inward the surplus winding end portion of the separator film, may be prevented.

Furthermore, in another specific example, the first roller and the second roller may allow the web to be interposed therebetween after the surplus winding end portion is horizontally bent, and then the first roller is moved downward and the second roller is moved upward, thereby performing a process of pressing the horizontally bent surplus winding end portion on the first unit cell.

Thus, by allowing the rollers to inwardly fold the surplus winding end portion of the separator film and to press the folded surplus winding end portion together with the first unit cell so that the surplus winding end portion of the separator film is fixed to the upper surface of the first unit cell, the separator film may be prevented from being folded out of the gripper of the mandrel, which may occur secondarily during winding using the mandrel, and thus a folding phenomenon of the separator in the folding process may be completely eliminated.

Further, since the first roller and the second roller perform a process of pressing the unit cells, a separate pressure roller for laminating the unit cells may not be required, and thus, the above described effects may be achieved without a great manufacturing cost difference in comparison with that of existing process equipment.

A length of the surplus winding end portion of the separator film in the web may be 5% to 100% of a width of the first unit cell, specifically may be 5% to 50%, and more specifically may be 10% to 40%. When an end of the surplus winding end portion is excessively adjacent to the winding start portion beyond the above range, folding of the separator film may be difficult, and a phenomenon such as spreading of the folded separator film again is likely to occur so that a defect rate may be high. When the end of the surplus winding end portion is excessively separated from the winding start portion beyond the above range, the surplus winding end portion is too large to cover the first unit cell at the time of folding, and a redundant surplus winding end portion, which is a portion of the surplus winding end portion that remains even after covering the first unit cell, is generated, and thus the efficiency of a winding process may be deteriorated, which is not preferable.

Meanwhile, there is no particular limitation on the number and structure of the upper and lower legs of the grippers as long as the upper and lower legs of the grippers can fix the upper surface of the first unit cell and the lower surface of the separator film, respectively.

In one specific example, the gripper may include two upper legs and two lower legs, and among them, the upper leg and the lower leg adjacent to the winding start portion may be located to be separated from the boundary between the unit cell and the separator film at a distance of 0 to 10% based on the width size of the first unit cell, specifically may be spaced at a distance of 0 to 2%.

As described above, when the upper leg and the lower leg adjacent to the winding start portion are excessively spaced from the boundary between the unit cell and the separator film so that the upper leg is located on the upper surface of the unit cell, the separator film may be folded to the position on which the leg is located in the winding process, which may cause a short circuit due to contact between the first unit cell and a second unit cell, which is not preferable.

The mandrel may include one or two grippers to effectively fix and wind the web, and for example, the mandrel may include a first gripper and a second gripper respectively located on both sides with respect to a protruding direction of electrode terminals of the unit cells arranged on the separator film and on both sides with respect to a vertical direction based on a traveling direction of the separator film.

The grippers are not particularly limited in their structures as long as the grippers can effectively fix the web.

Here, in order to wind the surplus winding end portion of the separator film, which is fixed to an upper portion of the first unit cell by the rollers, into a more firmly fixed state, the upper leg of the gripper may fix the first unit cell together with the horizontally bent surplus winding end portion of the separator film. That is, the first unit cell and the surplus winding end portion of the separator film may be wound together in a fixed state.

In this case, the separator film may be more effectively fixed in the winding process to prevent the folding phenomenon.

The folding device may further include other configurations known in the art in addition to those described above, and for example, the device may further include: a web supply unit configured to supply the web; a position teat unit configured to photograph a position of a unit cell of the web supply unit and send an acquired image signal to a control unit; the control unit configured to confirm an arrangement state of the unit cells based on the image signal received from the position test unit and control the position of the unit cell on the separator film; and more specifically, a heating zone configured to apply heat to the unit cell.

The present disclosure also provides a method of manufacturing a stacked/folded type electrode assembly by using the folding device.

Specifically, the method of manufacturing a stacked/folded type electrode assembly includes:

(a) manufacturing a plurality of unit cells including a positive electrode, a negative electrode, and a separator, and arranging the unit cells on a separator film in a long sheet form to manufacture a web;

(b) vertically bending a surplus winding end portion by moving upward a pair of rollers located on a boundary between the surplus winding end portion of the separator film and a first unit cell of a winding start portion, which is arranged in a state of being spaced apart from a winding end portion of the separator film in the web, and moving the pair of rollers in a direction of the first unit cell to horizontally bend the surplus winding end portion;

(c) pressing the horizontally bent surplus winding end portion of the separator film on the first unit cell after interposing the web between the pair of rollers; and (d) winding by rotating a mandrel so that the unit cells are sequentially stacked with the separator film interposed therebetween.

Here, as described above, the pair of rollers may include a first roller located at a relatively upper portion and a second roller located at a relatively lower portion in a process of horizontally bending the surplus winding end portion, and the pressing process of process (c) may be performed by moving the first roller downward and the second roller upward.

Further, the mandrel may include a gripper composed of at least one upper leg configured to fix an upper surface portion of the first unit cell and the separator film in which the surplus winding end portion is horizontally bent and at least one lower leg configured to fix a lower surface portion of the separator film corresponding to the upper leg, and the specific configuration of the gripper is as described above.

Further, the plurality of unit cells for manufacturing a stacked/folded type electrode assembly according to the present disclosure may be arranged in such a manner that, starting from the first unit cell of the winding start portion, the first unit cell and a second unit cell are arranged on the separator film at a separation distance corresponding to at least one unit cell, and the unit cells after the second unit cell may be arranged on the separator film in a form of an array in which distances between the unit cells are gradually increased corresponding to a winding width.

Here, the first unit cell and the second unit cell are spaced apart at the interval corresponding to at least one unit cell to fundamentally prevent a short circuit that may occur due to a contact between electrodes by allowing an outer surface of the first unit cell to face with electrodes of the other unit cells in a state in which the outer surface of the first unit cell is completely coated with the separator film during one winding in the winding process.

The unit cell may be a bi-cell or a full-cell, and a bi-cell and a full-cell may be used together as the unit cell. As described in the related art, a bi-cell has a stacked structure in which electrodes of the same type are located on both sides of a cell, and a full-cell has a stacked structure in which electrodes of different types are located on both sides of the cell. When an electrode assembly is formed using such a bi-cell and a full-cell, the arrangement structure is not limited as long as a positive electrode and a negative electrode are stacked so as to face each other.

In the bi-cell and full-cell, a positive electrode is prepared by applying a mixture of a positive electrode active material, a conductive material, and a binder on a positive electrode current collector and then drying and pressing the resultant, and a filler may be further added to the mixture as necessary.

The positive electrode current collector may be generally manufactured to a thickness of 3 to 500 μm. For the positive electrode current collector, a material not inducing the chemical change and having a high conductivity may be used without limitation. Examples of the positive electrode current collector may include stainless steel, aluminum, nickel, titanium, sintered carbon, or an aluminum or stainless steel surface treated with carbon, nickel, titanium or silver. The positive electrode current collector may have fine irregularities on the surface thereof to increase an adhesiveness of the positive electrode active material, and may have various shapes such as a film, a sheet, a foil, a net, a porous body, a foam, and a non-woven fabric, etc.

Examples of the positive electrode active material may include, for example, a layered compound of lithium cobalt oxide ($LiCoO_2$), lithium nickel oxide ($LiNiO_2$), etc. or a substituted compound with one or more transition metals; lithium manganese oxide such as $Li_1+xMn_2-xO_4$ (in which x is 0 to 0.33), $LiMnO_3$, $LiMn_2O$, $LiMnO_2$, etc.; lithium copper oxide ($Li_2CuO_2$); vanadium oxide such as $LiV_3O_8$, $LiFe_3O_4$, $V_2O_5$, $CuZV_2O_7$, etc.; Ni site-type lithium nickel oxide represented by Chemical Formula of $LiNiI-xMxO_2$ (in which, M=Co, Mn, Al, Cu, Fe, Mg, B or Ga, x=0.01 to 0.3); lithium manganese complex oxide represented by Chemical Formula $LiMn_2-xMxO_2$ (in which M=Co, Ni, Fe, Cr, Zn or Ta, and x=0.01 to 0.1) or $Li_2Mn_3MO_8$ (in which, M=Fe, Co, Ni, Cu or Zn); lithium manganese composite oxide having a spinel structure represented by $LiNi_xMn_{2-x}O4$; $LiMn_2O_4$ in which a portion of Li is substituted with alkaline earth metal ions; a disulfide compound; $Fe_e$ $(MoO_4)_3$, and the like. However, the present disclosure may not be limited thereof.

The conductive agent is generally added so that the conductive agent has 1 to 30 wt % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, thermal black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 30 wt % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as the filler does not cause chemical changes in a battery to which the filler is applied, and is made of a fibrous material. As examples of the filler, there may be used olefin polymers, such as polyethylene and polypropylene; and fibrous materials, such as glass fiber and carbon fiber.

The negative electrode, which is another electrode forming the bi-cell and the full cell, may be manufactured by applying, drying and pressing the negative electrode active material on the negative electrode current collector, and may further include the above conductive material, binder, filler and the like optionally.

The negative electrode current collector may be generally manufactured to a thickness of about 3 to 500 μm. For the negative electrode current collector and/or the extended current collect part, a material not inducing chemical change and having conductivity may be used without limitation. Examples of the negative electrode current collector may include copper, stainless steel, aluminum, nickel, titanium, baked carbon, or copper or stainless steel surface-treated with carbon, nickel, titanium, silver, etc., aluminum-cadmium ally, etc. Further, similarly to the positive electrode current collector, the negative electrode current collector and/or the extended current collect part may have fine irregularities on the surface thereof to increase an adhesiveness of the negative electrode active material, and may have various shapes such as a film, a sheet, a foil, a net, a porous body, a foam, and a non-woven fabric, etc.

As the negative electrode active material, for example, there may be used carbon, such as non-graphitizing carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \leq x \leq 1$; $1 \leq y \leq 3$; $1 \leq z \leq 8$); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

The separator is interposed between the positive electrode and the negative electrode in the unit cell, and an insulating thin film having high ion permeability and mechanical strength is used. A pore diameter of the separator is generally 0.01 to 10 μm, and a thickness thereof is generally 5 to 300 μm. For example, there may be used olefin-based polymers such as polypropylene, which is chemically resistant and hydrophobic; a sheet or a non-woven fabric made of glass fiber, polyethylene or the like may be used as an example of the separator. When a solid electrolyte such as a polymer is used as the electrolyte, the solid electrolyte may also serve as a separator. The separator film used in the present disclosure also corresponds to the description of the separator.

The present disclosure also provides a stacked/folded type electrode assembly manufactured by the above manufacturing method and a secondary battery including the electrode assembly, wherein the electrode assembly may be impregnated with a non-aqueous electrolytic solution containing a lithium salt.

The non-aqueous electrolytic solution containing a lithium salt may include a non-aqueous electrolytic solution and a lithium salt. Examples of the non-aqueous electrolytic solution may include non-aqueous organic solvent, organic solid electrolyte, inorganic solid electrolyte, etc., but may not be limited thereof.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature storage characteristics, the non-aqueous electrolytic solution may further include carbon dioxide gas, and may further include fluoro-ethylene carbonate (FEC), propene sultone (PRS), etc.

In one specific example, a non-aqueous electrolyte containing a lithium salt may be prepared by adding a lithium salt such as $LiPF_6$, $LiClO_4$, $LiBF_4$, $LiN(SO_2CF_3)_2$, etc. to a mixed solvent of a cyclic carbonate of EC or PC, which is a high-dielectric solvent, and a linear carbonate of DEC, DMC or EMC, which is a low viscosity solvent.

The present disclosure also provides a battery module using the secondary battery as a unit battery, a battery pack including the battery module and a device including the battery pack.

Specific examples of the device may include mobile electronics, a power tool powered by an electric motor; an electric vehicle including an electric vehicle (EV), a hybrid electric vehicle (HEV), a plug-in hybrid electric vehicle (PHEV), etc.; an electric motorcycle including an electric bike (E-bike) and electric scooter (E-scooter); an electric golf cart; power storage systems and etc., but the present disclosure is not limited thereto.

A structure of the battery module and the battery pack, a manufacturing method thereof, a structure of the above devices and a manufacturing method thereof are well known in the art, so a detailed description thereof will be omitted herein.

Advantageous Effect

As described above, a folding device according to the present disclosure includes a pair of rollers configured to horizontally bend a surplus winding end portion of a separator film, which is formed by arranging a first unit cell at a winding start portion of a web in a state of being spaced apart from a winding end portion of the separator film, in a direction covering an upper surface of the first unit cell, and a stacked/folded type electrode assembly can be manufactured by using the folding device. Accordingly, the rollers can hold the surplus winding end portion of the separator film to the end of a folding process and thus the separator film can be prevented from being blown in the other direction, and since a process of pressing the folded separator film and first unit cell is performed after the rollers fold inward the surplus winding end portion of the separator film, a folding phenomenon of the separator film, which may occur secondarily during winding using a mandrel, can be prevented, thereby completely solving the conventional problems, remarkably reducing a defect rate, and improving the safety of a battery.

Further, since the rollers can perform the function of pressing the separator film and unit cells which will be arranged later, a separate pressure roller is not required, and thus, the above described effects can be achieved without a great manufacturing cost difference in comparison with that of existing process equipment.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, the present disclosure will be described in detail with reference to the drawings, but the scope of the present disclosure is not limited thereto.

Figure 1:
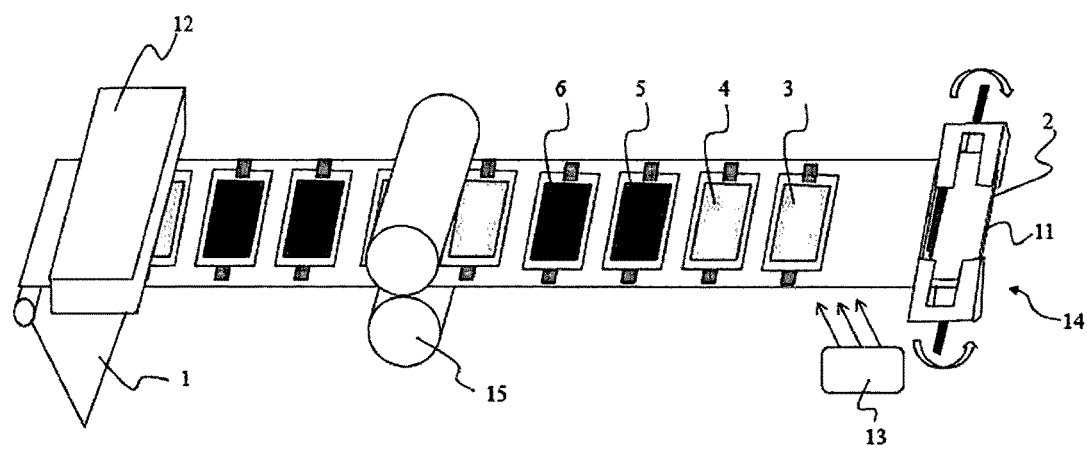
FIG. 1 is a schematic view of a conventional folding device for manufacturing a stacked/folded type electrode assembly.
Figure 2:
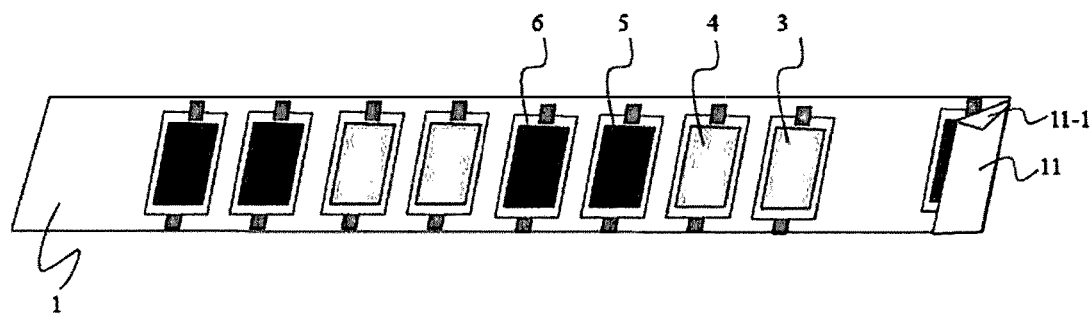
FIG. 2 is a schematic view showing a state in which a surplus winding end portion of a separator film is folded inward before being wound, when the folding device of FIG. 1 is used.
Figure 3:
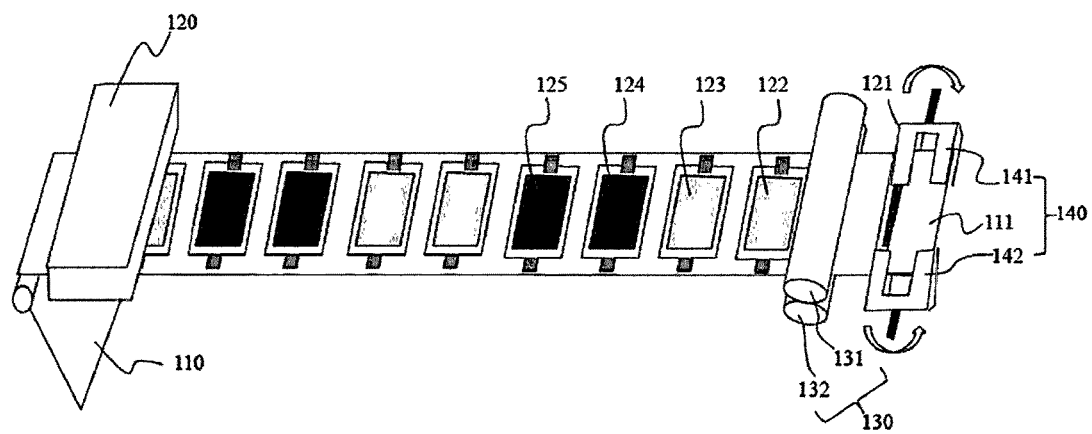
FIG. 3 is a schematic view of a folding device for manufacturing a stacked/folded type electrode assembly according to one embodiment of the present disclosure.

FIG. 3 is a schematic view of a folding device for manufacturing a stacked/folded type electrode assembly according to one embodiment of the present disclosure.

Referring to FIG. 3, a folding device 100 according to the present disclosure is a folding device configured to arrange unit cells 121, 122, 123 and 124 to transfer to a mandrel 140 and the device includes a unit cell arrangement unit 120 configured to arrange the unit cells 121, 122, 123 and 124 on a separator film 110 at a predetermined interval, a pair of rollers 130 configured to vertically and horizontally bend a surplus winding end portion 111 of the separator film, which is formed by arranging a first unit cell 121 at a winding start portion in a state of being spaced apart from a winding end portion of the separator film, in a direction covering an upper surface of the first unit cell 121 and configured to press the unit cells, and the mandrel 140 configured to rotate and wind a web, in which the unit cells 121, 122, 123 and 124 are arranged on an upper surface of the separator film 110 at predetermined intervals, so that the unit cells 121, 122, 123 and 124 are sequentially stacked with the separator film 110 interposed therebetween.

Here, the pair of rollers 130 include a first roller 131 located at a relatively upper portion and a second roller 132 located at a relatively lower portion with respect to the separator film 110 after the surplus winding end portion 111 is being horizontally bended.

Figure 4:
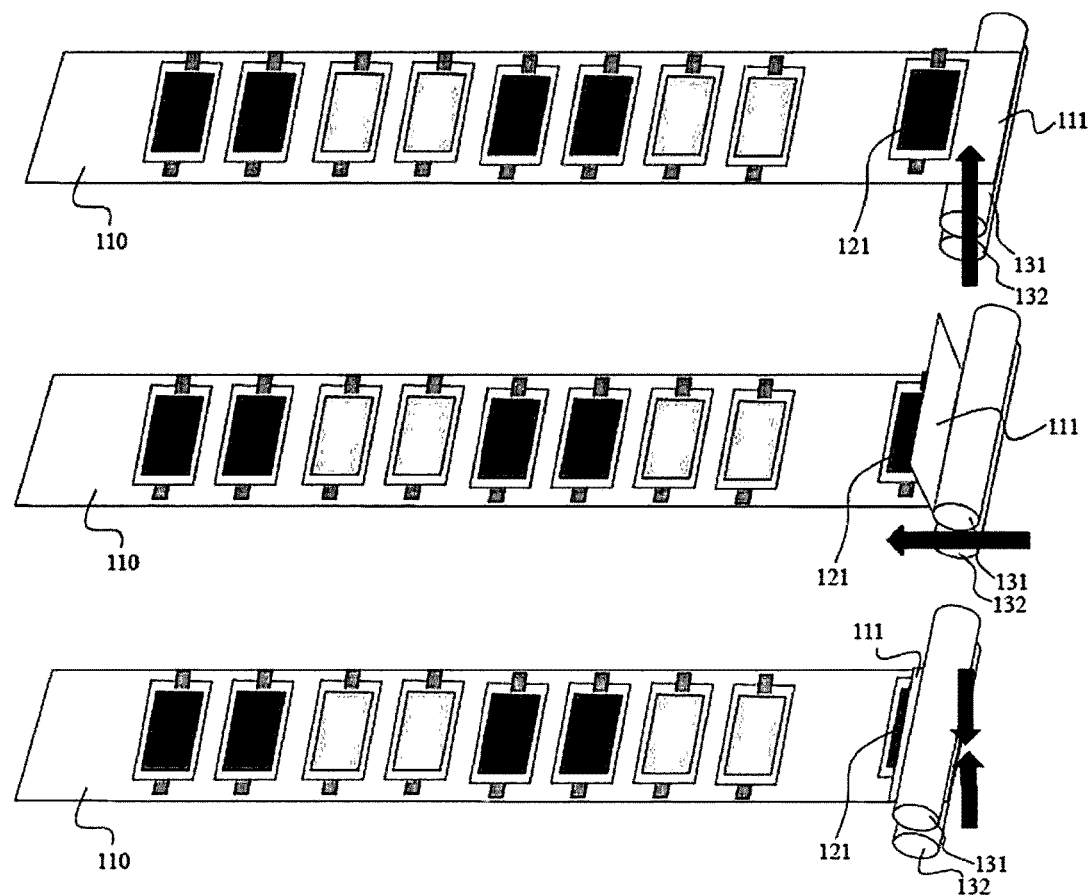
FIG. 4 is a schematic view showing a process in which a surplus winding end portion of a separator film is folded inward by rollers before being wound, when the folding device of FIG. 3 is used.

FIG. 4 is a schematic view for explaining a specific operation in which the pair of rollers 130 fold inward the surplus winding end portion 111 of the separator film in a direction covering the upper surface of the first unit cell 121. Here, the moving direction is indicated by an arrow.

Referring to FIG. 4 together with FIG. 3, the first roller 131 and the second roller 132 move upward to vertically bend the surplus winding end portion 111 upward in a state of being positioned close to a boundary between the first unit cell 121 and the surplus winding end portion 111 of the separator film at a lower portion of the separator film 110, and move in a direction of the first unit cell 121 to horizontally bend the vertically bent surplus winding end portion 111 in a direction of the upper surface of the first unit cell 121, so that the surplus winding end portion 111 of the separator film may be folded inward in the direction of covering the upper surface of the first unit cell 121.

Thereafter, in a state in which the web is interposed between the first roller 131 and the second roller 132, the first roller 131 moves downward and the second roller 132 moves upward, thereby performing a process of pressing the horizontally bent surplus winding end portion 111 on the first unit cell 121.

Figure 5:
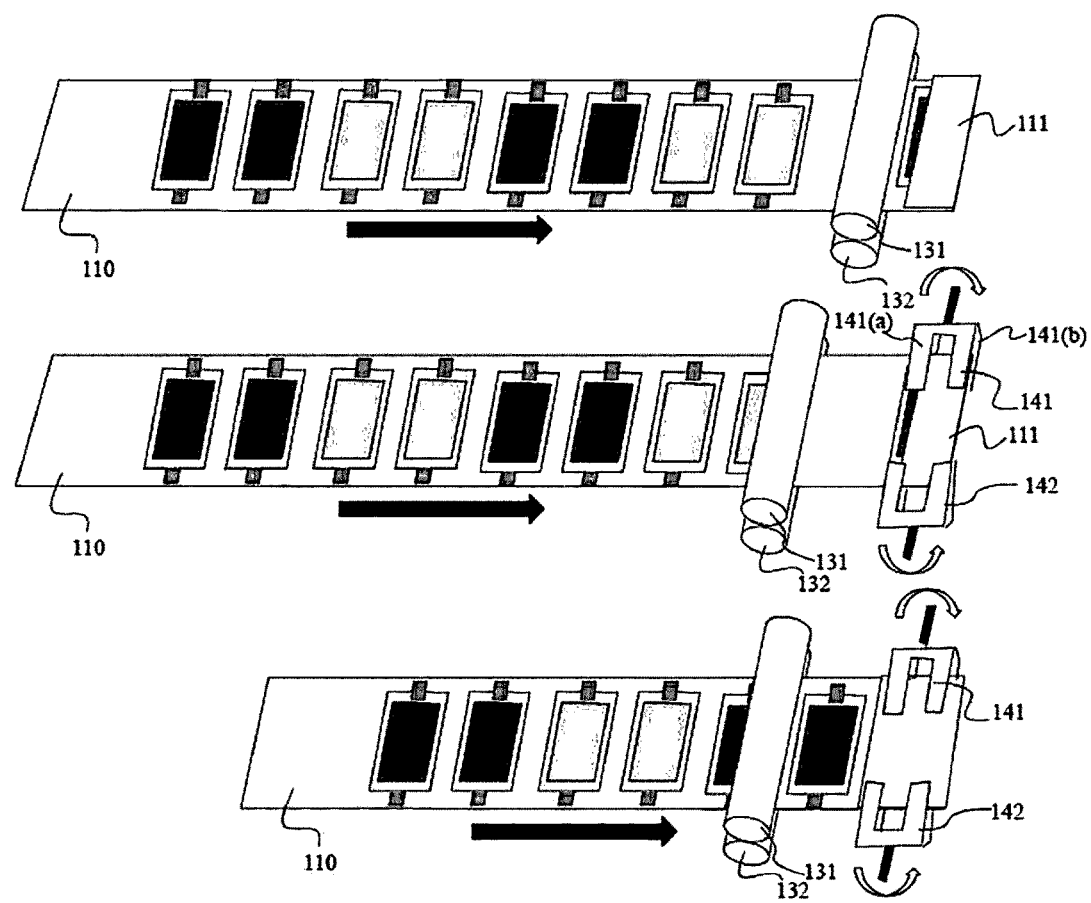
FIG. 5 is a schematic view showing a process in which the surplus winding end portion of the separator film is wound by a mandrel after being folded inward, when the folding device of FIG. 3 is used.

FIG. 5 is a schematic view for explaining a process of winding the surplus winding end portion 111 by the mandrel to explain the process after the surplus winding end portion 111 of the separator film 110 is bent.

Referring to FIG. 5 together with FIG. 3, the web horizontally moves in the direction in which the mandrel is placed for winding when the surplus winding end portion 111 of the separator film is folded inward in the direction of covering the upper surface of the first unit cell 121.

The first unit cell 121 of the horizontally moved web and the surplus winding end portion 111 of the separator film, which is fixed to an upper portion of the first unit cell 121, are fixed together by grippers 141 and 142 of the mandrel, and then, the mandrel 140 rotates to start winding so that the unit cells 121, 122, 123, and 124 are sequentially stacked with the separator film 110 interposed therebetween.

Here, the mandrel includes a first gripper 141 and a second gripper 142 located on both sides of the separator film with respect to the vertical direction based on the traveling direction of the separator film to effectively fix and wind the web, and each of the grippers 141 and 142 includes at least one upper leg 141 (a) configured to fix the surplus winding end portion 111 of the separator film and an upper surface portion of the first unit cell 121 and at least one lower legs 141 (b) configured to fix a lower surface portion of the separator film 110 corresponding to the upper leg 141 (a).

In such a folding process, the first roller 131 and the second roller 132, which have performed the folding of the surplus winding end portion 111 of the separator film, are maintained in a pressing state to serve as a lamination roller for laminating the remaining unit cells 121, 122, 123, and 124 when the unit cells 121, 122, 123, 124 are transported later. Accordingly, a separate lamination roller is not required.

As described above, since the first roller and the second roller fold the entire surplus winding end portion of the separator film and also horizontally bend the surplus winding end portion in the direction of the upper surface of the first unit cell, the rollers may hold the surplus winding end portion of the separator film to the end of a folding process. Accordingly, a phenomenon in which the separator film is blown and folded in the other direction, which is a problem that may occur when a wind is blown by using a method such as a blower to fold inward the surplus winding end portion of the separator film, may be prevented.

Further, by allowing the rollers to inwardly fold the surplus winding end portion of the separator film and to press the folded surplus winding end portion together with the first unit cell so that the surplus winding end portion of the separator film is fixed to the upper surface of the first unit cell, the separator film may be prevented from folding out of the gripper of the mandrel, which may occur later secondarily during winding using the mandrel, so that a folding phenomenon of the separator film in the folding process may be completely eliminated.

As described above, a folding device according to the present disclosure includes a pair of rollers configured to horizontally bend a surplus winding end portion of a separator film, which is formed by arranging a first unit cell at a winding start portion of a web in a state of being spaced apart from a winding end portion of the separator film, in a direction covering an upper surface of the first unit cell, and a stacked/folded type electrode assembly can be manufactured by using the folding device. Accordingly, the rollers can hold the surplus winding end portion of the separator film to the end of a folding process and thus the separator film can be prevented from being blown in the other direction, and since a process of pressing the folded separator film and first unit cell is performed after the rollers fold inward the surplus winding end portion of the separator film, a folding phenomenon of the separator film, which may occur secondarily during winding using a mandrel, can be prevented, thereby completely solving the conventional problems, remarkably reducing a defect rate, and improving the safety of a battery.

Further, since the rollers can perform the function of pressing the separator film and unit cells which will be arranged later, a separate pressure roller is not required, and thus, the above described effects can be achieved without a great manufacturing cost difference in comparison with that of existing process equipment.

It should be understood by those skilled in the art that various changes may be made without departing from the spirit and scope of the present disclosure.

The invention claimed is:

1. A folding device for manufacturing an electrode assembly having a structure in which plate type unit cells are wound with a separator film, comprising:
    a mandrel configured to rotate and wind a web in which plate type unit cells are arranged on an upper surface of the separator film at predetermined intervals so that the unit cells are sequentially stacked with the separator film interposed therebetween; and
    a pair of rollers configured to horizontally bend a surplus winding end portion of the separator film, which is formed by arranging a first unit cell at a winding start portion of the web in a state of being spaced apart from a winding end portion of the separator film, in a direction covering an upper surface of the first unit cell,
    wherein the mandrel includes one or more grippers composed of one or more upper legs configured to fix an upper surface portion of the first unit cell and one or more lower legs configured to fix a lower surface portion of the separator film corresponding to the upper legs, and the pair of rollers operate to vertically bend the surplus winding end portion of the separator film upward and then horizontally bend the surplus winding end portion toward the upper surface of the unit cell.

2. The device of claim 1, wherein the pair of rollers is configured to operate independently of each other, or to operate in conjunction with each other.

3. The device of claim 1, wherein the pair of rollers includes a first roller located at a relatively upper portion and a second roller located at a relatively lower portion in a process of horizontally bending the surplus winding end portion.

4. The device of claim 3, wherein the first roller and the second roller move upward to vertically bend the surplus winding end portion upward in a state of being positioned close to a boundary between the first unit cell and the surplus winding end portion of the separator film at a lower portion of the separator film, and move in a direction of the first unit cell to horizontally bend the vertically bent surplus winding end portion in a direction of the upper surface of the first unit cell, so that the surplus winding end portion of the separator film is folded inward in the direction of covering the upper surface of the first unit cell.

5. The device of claim 4, wherein the first roller and the second roller allow the web to be interposed therebetween after the surplus winding end portion is horizontally bent, and then the first roller is moved downward and the second roller is moved upward, thereby performing a process of pressing the horizontally bent surplus winding end portion on the first unit cell.

6. The device of claim 1, wherein a length of the surplus winding end portion of the separator film in the web is 5% to 100% of a width of the first unit cell.

7. The device of claim 1, wherein the upper leg of the gripper fixes the first unit cell together with the horizontally bent surplus winding end portion of the separator film.

8. A method of manufacturing a stacked/folded type electrode assembly by using the folding device of claim 1, comprising:
   (a) manufacturing a plurality of unit cells including a positive electrode, a negative electrode, and a separator, and arranging the unit cells on a separator film in a long sheet form to manufacture a web;
   (b) vertically bending a surplus winding end portion by moving upward a pair of rollers located on a boundary between the surplus winding end portion of the separator film and a first unit cell of a winding start portion, which is arranged in a state of being spaced apart from a winding end portion of the separator film in the web, and moving the pair of rollers in a direction of the first unit cell to horizontally bend the surplus winding end portion;
   (c) pressing the horizontally bent surplus winding end portion of the separator film on the first unit cell after interposing the web between the pair of rollers; and
   (d) winding by rotating a mandrel so that the unit cells are sequentially stacked with the separator film interposed therebetween.

9. The method of claim 8, wherein the pair of rollers includes a first roller located at a relatively upper portion and a second roller located at a relatively lower portion in a process of horizontally bending the surplus winding end portion.

10. The method of claim 9, wherein the pressing process of process (c) is performed by moving the first roller downward and the second roller upward.

11. The method of claim 8, wherein the mandrel includes a gripper composed of at least one upper leg configured to fix an upper surface portion of the first unit cell and the separator film in which the surplus winding end portion is horizontally bent and at least one lower leg configured to fix a lower surface portion of the separator film corresponding to the upper leg.

12. The method of claim 8, wherein the first unit cell and a second unit cell among the plurality of unit cells are arranged on the separator film at a separation distance corresponding to at least one unit cell, and the unit cells after the second unit cell are arranged on the separator film in a form of an array in which distances between the unit cells are gradually increased corresponding to a winding width.

13. A secondary battery including the stacked/folded electrode assembly manufactured by the method of claim 8.

* * * * *